(12) United States Patent
Nonaka et al.

(10) Patent No.: US 7,441,699 B2
(45) Date of Patent: Oct. 28, 2008

(54) OUTPUT TERMINAL, DATA OUTPUT SYSTEM, AND DATA OUTPUT METHOD

(75) Inventors: Nobuyuki Nonaka, Tokyo (JP); Toshimi Koyama, Tokyo (JP)

(73) Assignees: Aruze Corp., Tokyo (JP); Seta Corp., Tokyo (JP)

( * ) Notice: Subject to any disclaimer, the term of this patent is extended or adjusted under 35 U.S.C. 154(b) by 159 days.

(21) Appl. No.: 11/452,960

(22) Filed: Jun. 15, 2006

(65) Prior Publication Data

US 2006/0289627 A1 Dec. 28, 2006

(30) Foreign Application Priority Data

Jun. 24, 2005 (JP) ............................. 2005-184853

(51) Int. Cl.
*G06K 5/00* (2006.01)
(52) U.S. Cl. .................. 235/382; 235/487; 235/375; 235/382.5; 705/67; 705/44
(58) Field of Classification Search ............... 235/382, 235/380, 375, 382.5, 487; 705/67, 44, 18
See application file for complete search history.

(56) References Cited

U.S. PATENT DOCUMENTS

| 2002/0169002 | A1 | 11/2002 | Imbrie et al. |
|---|---|---|---|
| 2003/0014640 | A1 | 1/2003 | Loyd |
| 2003/0101342 | A1 | 5/2003 | Hansen |
| 2004/0004735 | A1 | 1/2004 | Oakeson |
| 2005/0094184 | A1 | 5/2005 | Suychira |

FOREIGN PATENT DOCUMENTS

| EP | 0 691 619 | 1/1996 |
|---|---|---|
| JP | 2003-323490 | 11/2003 |

*Primary Examiner*—Edwyn Labaze
(74) *Attorney, Agent, or Firm*—Oliff & Berridge PLC (57) ABSTRACT

An output terminal has an electronic data item receiving unit, an identification code receiving unit, a determination unit, and an output unit. The electronic data item receiving unit receives an electronic data item. When a person exists within a predetermined range from the output terminal, the identification code receiving unit receives an identification code concerning the person. The determination unit determines whether the identification code received by the identification code receiving unit is authentic or not. When the determination unit determines that the identification code is authentic, the output unit outputs the electronic data item received by the electronic data item receiving unit.

7 Claims, 10 Drawing Sheets

IN-ROOM PERSON DATA TABLE

| STAFF IDENTIFICATION CODE | FAX IDENTIFICATION CODE |
|---|---|
| 0010 | abcd<br>(THIRD FACSIMILE MACHINE) |
| 0013 | efgh<br>(FIFTH FACSIMILE MACHINE) |
| ⋮ | ⋮ |

OUTPUT TERMINAL, DATA OUTPUT SYSTEM, AND DATA OUTPUT METHOD

CROSS REFERENCE TO RELATED APPLICATION

This application is based upon and claims the benefit of priority from the prior Japanese Patent Application No. 2005-184853, filed on Jun. 24, 2005, the entire contents of which are incorporated herein by reference.

BACKGROUND OF THE INVENTION

1. Field of the Invention

The present invention relates to an output terminal, a data output system, and a data output method by which electronic data addressed to a specific destination is outputted.

2. Description of Related Art

An increasing number of companies are introducing a free-space office in which each staff member does not have his/her own seat and is allowed to freely sit in any empty seat to work thereat. In the free-space office, however, when a staff member wants to communicate with another staff member, he/she has to find where another staff member stays, because staff members do not have their own seats. A possible way to solve this problem is, for example, introduction of a system that uses an IC tag for obtaining information about where a person is, as disclosed in Japanese Patent Unexamined Publication No. 2003-323490.

The system disclosed in the above-mentioned publication is adopted in a hospital for example, in order to always know where a patient is. Each patient carries an IC tag which emits an identification code at predetermined intervals, and IC tag readers disposed at various places receive the identification code, to thereby grasp where each patient is.

SUMMARY OF THE INVENTION

By introducing the above-described system into an office, a location of each staff member can be grasped. However, in a case where, for example, a staff member wants to transmit fax data to a certain specific staff member in a large office having several facsimile machines placed therein, it is likely that the destination staff member does not notice a data output and instead another staff member receives the data without permission, because even though a location of the destination staff member can be grasped, the fax data may be outputted from a facsimile machine that is placed away from the destination staff member. Therefore, a security problem arises. This security problem becomes more serious in transmission of highly confidential data.

In a case where persons belonging to the same section do not gather at one place in an office while working, it is likely not only that fax data is outputted from a facsimile machine placed away from a destination staff member who therefore cannot notice the data output, but also that even though a person existing around the facsimile machine notices the data output he/she cannot know to whom he/she should pass the data.

The above-described problems may occur with output terminals such as printers as well as facsimile machines.

Moreover, an output terminal such as a facsimile machine, a printer, or the like outputs data regardless of presence or absence of a person therearound. Accordingly, even when, for example, a stranger other than staff members exists around an output terminal, the output terminal undesirably outputs data. The security problem arises from this viewpoint as well.

An object of the present invention is to provide an output terminal, a data output system, and a data output method which realize a high-security data output by ensuring that electronic data can be received by a destination person.

According to a first aspect of the present invention, there is provided an output terminal comprising an electronic data item receiving unit, an identification code receiving unit, a determination unit, and an output unit. The electronic data item receiving unit receives an electronic data item. When a person exists within a predetermined range from the output terminal, the identification code receiving unit receives an identification code concerning the person. The determination unit determines whether the identification code received by the identification code receiving unit is authentic or not. When the determination unit determines that the identification code is authentic, an output unit outputs the electronic data item received by the electronic data item receiving unit.

In the first aspect, only when a received identification code is authentic, that is, only when a person who has an authentic identification code exists around the output terminal, the output terminal outputs an electronic data item. This ensures that the electronic data item can be received by a destination person which in this case means the person having an authentic identification code, thus realizing a high-security data output.

According to a second aspect of the present invention, there is provided an output terminal comprising an electronic data item receiving unit, a specific code acquiring unit, an identification code receiving unit, a determination unit, and an output unit. The electronic data item receiving unit receives an electronic data item. Based on the electronic data item received by the electronic data item receiving unit, the specific code acquiring unit acquires a specific code for specifying a destination of the electronic data item. When a person exists within a predetermined range from the output terminal, the identification code receiving unit receives an identification code concerning the person. The determination unit determines whether the identification code received by the identification code receiving unit and the specific code acquired by the specific code acquiring unit correspond to each other or not. When the determination unit determines that the identification code received and the specific code acquired correspond to each other, the output unit outputs the electronic data item received by the electronic data item receiving unit.

According to a third aspect of the present invention, there is provided a data output system comprising an IC chip, an identification code receiving unit, an electronic data item receiving unit, a specific code acquiring unit, a determination unit, and an output unit. The IC chip stores therein an identification code for identifying a person. The identification code receiving unit receives an identification code stored in the IC chip. The electronic data item receiving unit receives an electronic data item. Based on the electronic data item received by the electronic data item receiving unit, the specific code acquiring unit acquires a specific code for specifying a destination of the electronic data item. The determination unit determines whether the identification code received by the identification code receiving unit and the specific code acquired by the specific code acquiring unit correspond to each other or not. When the determination unit determines that the identification code received and the specific code acquired correspond to each other, the output unit outputs the electronic data item received by the electronic data item receiving unit.

According to a fourth aspect of the present invention, there is provided a data output method comprising the steps of: receiving an electronic data item; acquiring, based on the electronic data item received in the step of receiving an electronic data item, a specific code that specifies a destination of the electronic data item; receiving from an output terminal, when a person exists within a predetermined range from the output terminal, an identification code concerning the person; determining whether the identification code received in the step of receiving an identification code and the specific code acquired in the step of acquiring a specific code correspond to each other or not; and outputting from the output terminal, when it is determined that the identification code received and the specific code acquired correspond to each other in the step of determining, the electronic data item received in the step of receiving an electronic data item.

In the second to fourth aspects, a destination of an electronic data item is specified by a specific code. Whether the specific code and the identification code received by the identification code receiving unit correspond to each other is determined. When it is determined that they correspond, the electronic data item is outputted. That is, only when a person whose identification code corresponds to the specific code exists around the output terminal, the electronic data item is outputted. This ensures that the electronic data item can be received by a destination person, thus realizing a high-security data output.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, a certain preferred embodiment of the present invention will be described with reference to the accompanying drawings.

Figure 1:
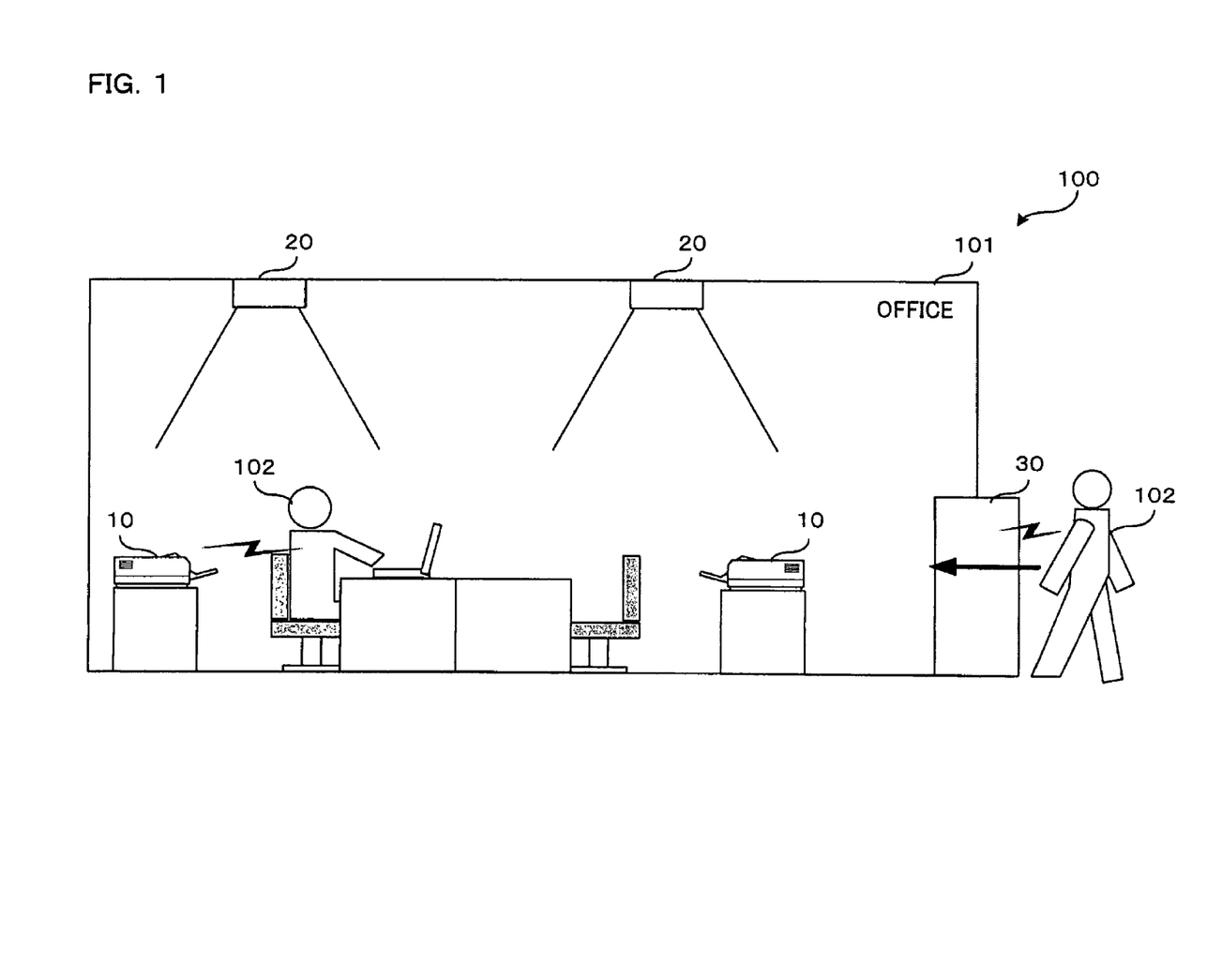
FIG. 1 schematically illustrates a construction of a data output system according to an embodiment of the present invention.

First, with reference to FIG. 1, a description will be given to a facsimile machine 10 functioning as an output terminal and a management system 100 functioning as a data output system, according to an embodiment of the present invention.

Facsimile machines 10 are placed in an office 101. The management system 100 includes facsimile machines 10, human body sensors 20, an enter/exit gate 30, and a server 40 (see FIG. 2). The human body sensors 20 are provided on a ceiling of the office 101. The enter/exit gate 30 is provided at an entrance to the office 101. The server 40 is capable of data communication with the above-mentioned devices, respectively.

The office 101 has introduced a so-called free spacing, and a staff member 102 working at each office 101 does not have his/her own seat. The staff member 102 always carries an IC card 60 (see FIG. 3), and freely uses an empty seat to work thereat.

Figure 3:
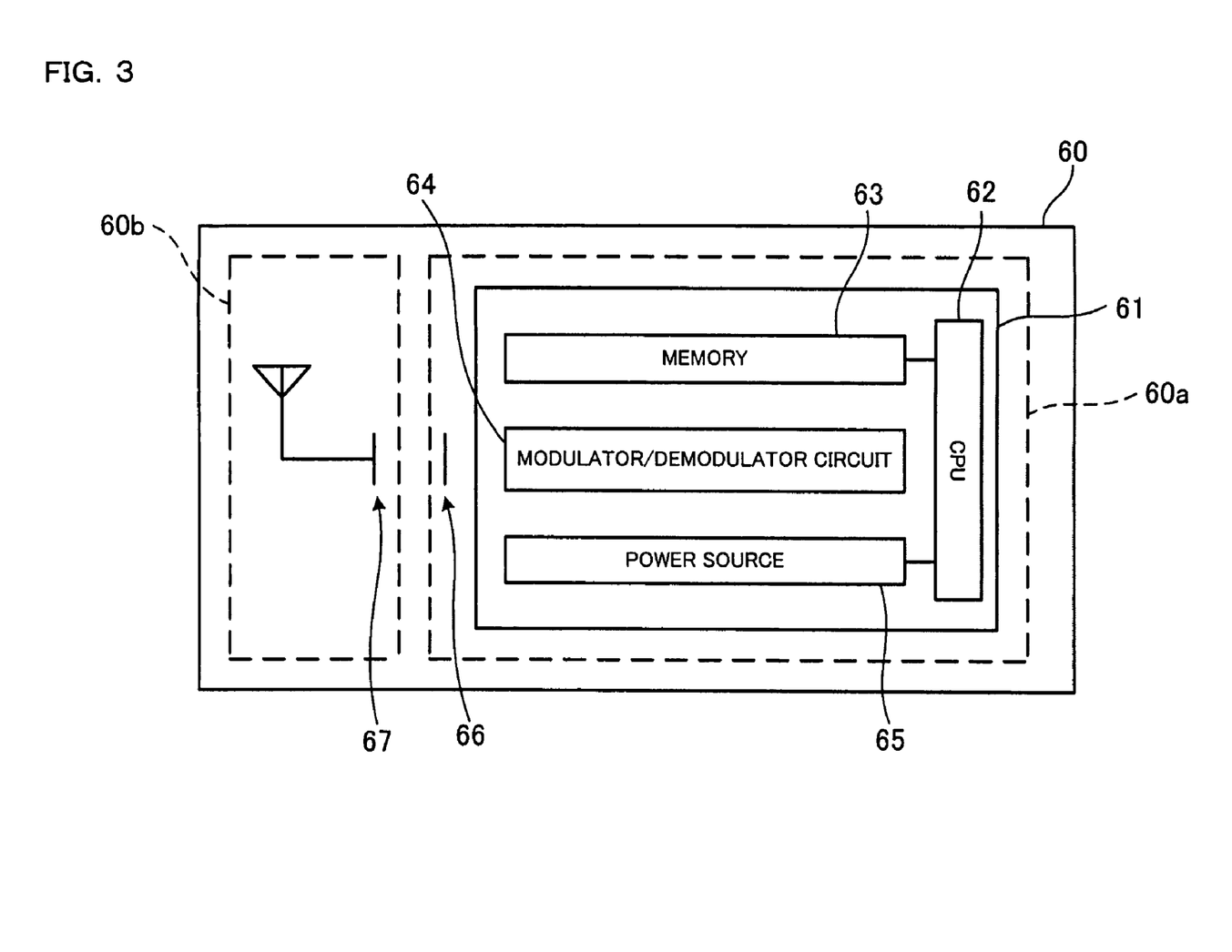
FIG. 3 is a block diagram showing an electrical construction of an IC card that is carried around by each staff member.
Figure 4:
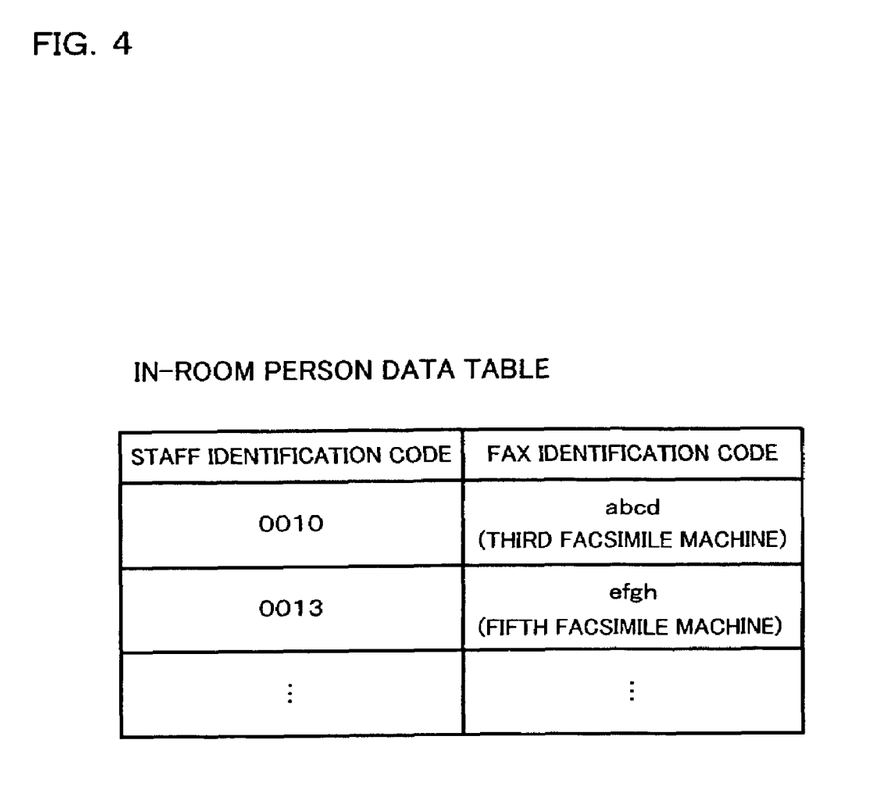
FIG. 4 shows an in-room person data table that is stored in the server.

As shown in FIG. 3, the IC card 60 has an IC main body 60a and a mounted body 60b that is removably mounted to the IC main body 60a. The IC main body 60a has an IC chip 61 and an antenna 66 for wireless communication. Through the antenna 66, the IC main body 60a communicates data with the facsimile machines 10 and the enter/exit gate 30. The IC chip 61 includes a CPU 62, a memory 63, a modulator/demodulator circuit 64, and a power source 65. The memory 63 is electrically writable and erasable, and stores therein a staff identification code which is specific to each individual IC card 60. The staff identification code is composed of a 4-digit number (see FIG. 4). The modulator/demodulator circuit 64 modulates and demodulates data that is transmitted or received through the antenna 66. The power source 65 supplies power to the CPU 62 and the modulator/demodulator circuit 64. Since the power source 65 is provided on the IC main body 60a, the IC main body 60a is able to emit a weak radio wave by itself.

The IC main body 60a emits at predetermined intervals an automatic signal that carries the staff identification code. The automatic signal is received by a facsimile machine 10 that is placed within a communication coverage of this signal. Also, as will be described later, upon reception of an interrogation signal from the enter/exit gate 30, the IC main body 60a emits a response signal that carries the staff identification code. The response signal is received by the enter/exit gate 30 that has transmitted the interrogation signal.

The mounted body 60b has a sub antenna 67 that is adapted to a frequency band different from a frequency band to which the antenna 66 of the IC main body 60a is adapted. Each of the antenna 66 and the sub antenna 67 is a so-called dipole antenna including a flat-plate conductor. The mounted body 60b is mounted to the IC main body 60a in such a manner that the conductor of the antenna 66 and the conductor of the sub antenna 67 are separated away from each other and at least partly confront each other. This makes the antenna 66 and the sub antenna 67 function like electrode plates of a capacitor, so that a signal received by the sub antenna 67 is supplied from the sub antenna 67 through the antenna 66 to the IC chip 61.

When an interrogation signal transmitted from the enter/exit gate 30 is in a frequency band that is different from a frequency band to which the antenna 66 is adapted, the IC main body 60a cannot receive this interrogation signal. However, when the interrogation signal is in a frequency band to which the sub antenna 67 of the mounted body 60b is adapted, the interrogation signal is received by the mounted body 60b and then transmitted to the IC main body 60a. Accordingly, presence of the mounted body 60b enables the IC card 60 to receive a signal in broader frequency band as compared with when the IC card 60 has the IC main body 60a alone.

Figure 2:
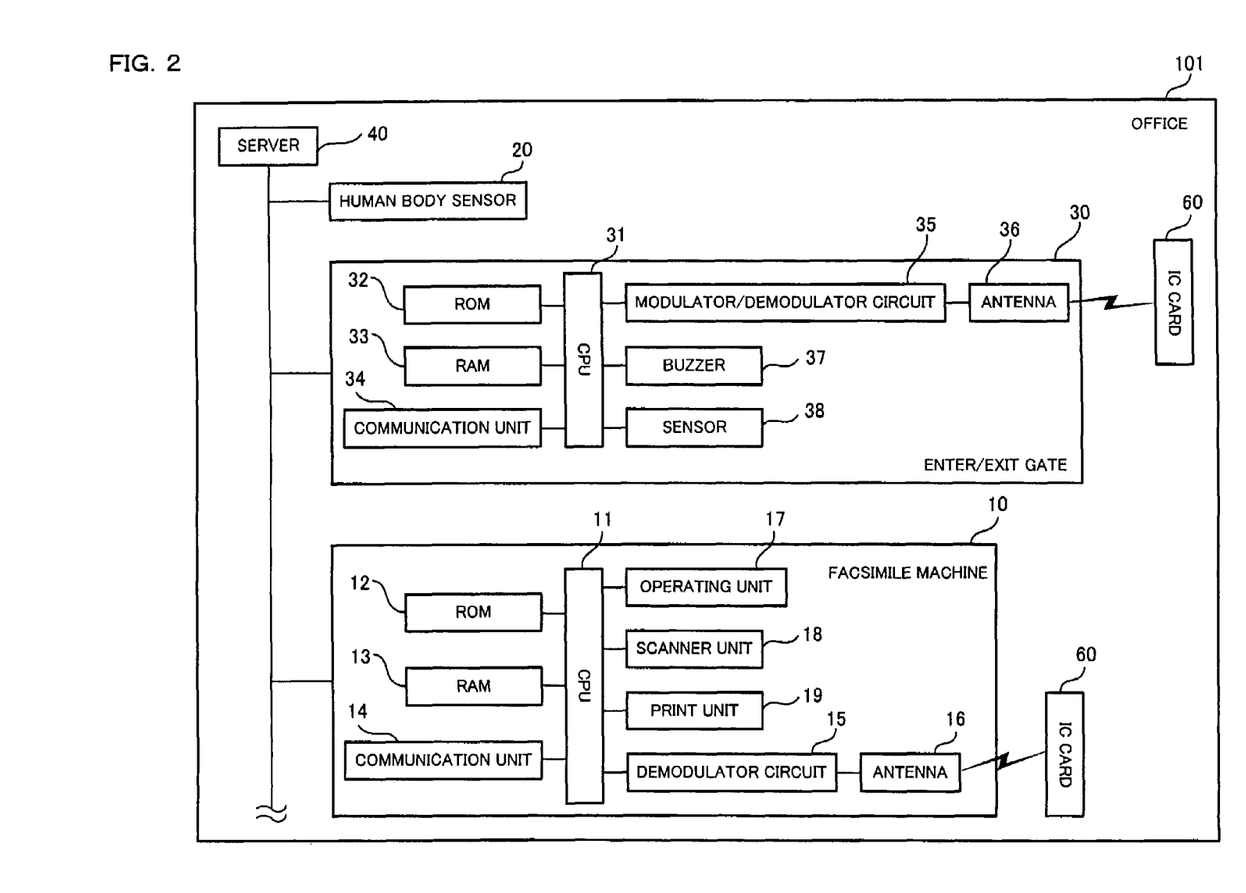
FIG. 2 is a block diagram showing an electrical construction of a server and devices connected to the server that are included in the data output system.

The enter/exit gate 30 reads a staff identification code stored in an IC card 60 that is carried around by a staff member 102 who enters or exits the office 101. As shown in FIG. 2, the enter/exit gate 30 has a CPU 31, a ROM 32, a RAM 33, a communication unit 34, a modulator/demodulator circuit 35, a buzzer 37, and a sensor 38. The ROM 32 stores therein a program which will be executed by the CPU 31. The RAM 33 stores therein data. The communication unit 34 implements data communication with the server 40. The modulator/demodulator circuit 35 modulates and demodulates data that is transmitted or received through an antenna 36. The buzzer 37 emits an alarm sound, when an intruder is detected. The sensor 38 detects a staff member 102 entering or exiting the office 101, by use of an infrared ray for example.

As shown in FIG. 2, the facsimile machine 10 has a CPU 11, a ROM 12, a RAM 13, a communication unit 14, a demodulator circuit 15, a scanner unit 18, a print unit 19, and an operating unit 17. The communication unit 14 implements data communication with the server 40 and with an external network such as a telephone network. The demodulator circuit 15 demodulates data that is received through an antenna 16 from an IC card 60. The scanner unit 18 reads a document or the like, and converts it into image data. The print unit 19 outputs image data in a printed form. The operating unit 17 is operated by a user of the facsimile machine 10. The ROM 12 stores therein a program executed by the CPU 11, a fax identification code which is specific to each individual facsimile machine 10, and the like.

Through a communication line, the facsimile machine 10 transmits and receives fax data to/from an external facsimile machine, personal computer, or the like. The communication line may be either of an intra-office line and an extra-office line. The fax data includes image data and a specific code that specifies a destination of the fax data. The specific code corresponds to a staff identification code.

It may be possible that, when transmitting fax data, a user of the facsimile machine 10 inputs a specific code through the operating unit 17. More specifically, it may be possible to, after a user of the facsimile machine 10 inputs a fax number to thereby access a communication line, provide a guidance according to which the user inputs a specific code. Alternatively, it may also be possible that the scanner unit 18 reads a document on which a specific code is written. The specific code can be set appropriately. For example, in a case where the communication line is an intra-office line, the specific code may be a staff member number, a name of a staff member 102, etc.

The human body sensor 20 detects an infrared ray radiated from a body of a staff member 102, by use of a pyroelectric infrared sensor for example, and then measures a temperature distribution. Using a measurement result, the human body sensor 20 detects how many staff members 102 are existing around a corresponding facsimile machine 10. The human body sensors 20 are disposed in such a manner that each of them can detect a staff member 102 who exists within a predetermined range from each one of the facsimile machines 10. Here, the predetermined range means a data-communication coverage, and more specifically means a range within which each facsimile machine 10 can receive an automatic signal emitted from an IC card 60. The human body sensor 20 transmits, to the server 40, data about the number of persons detected and a sensor identification code which is specific to each individual human body sensor 20.

Although not illustrated, the server 40 has a CPU, a ROM, a RAM, a storage, a display, etc., and can communicate data with the facsimile machines 10, the human body sensors 20, and the enter/exit gate 30 with or without a wire. Upon every reception of a staff identification code or a fax identification code, the server 40 creates or updates in-room person data shown in FIG. 4. The in-room person data is, in the form of a data table associating each staff identification code with a fax identification code, stored in the storage. The server 40 refers to an in-room person data table stored in the storage, to know around which facsimile machine 10 within the office 101 each staff member 102 currently exists.

Figure 5:
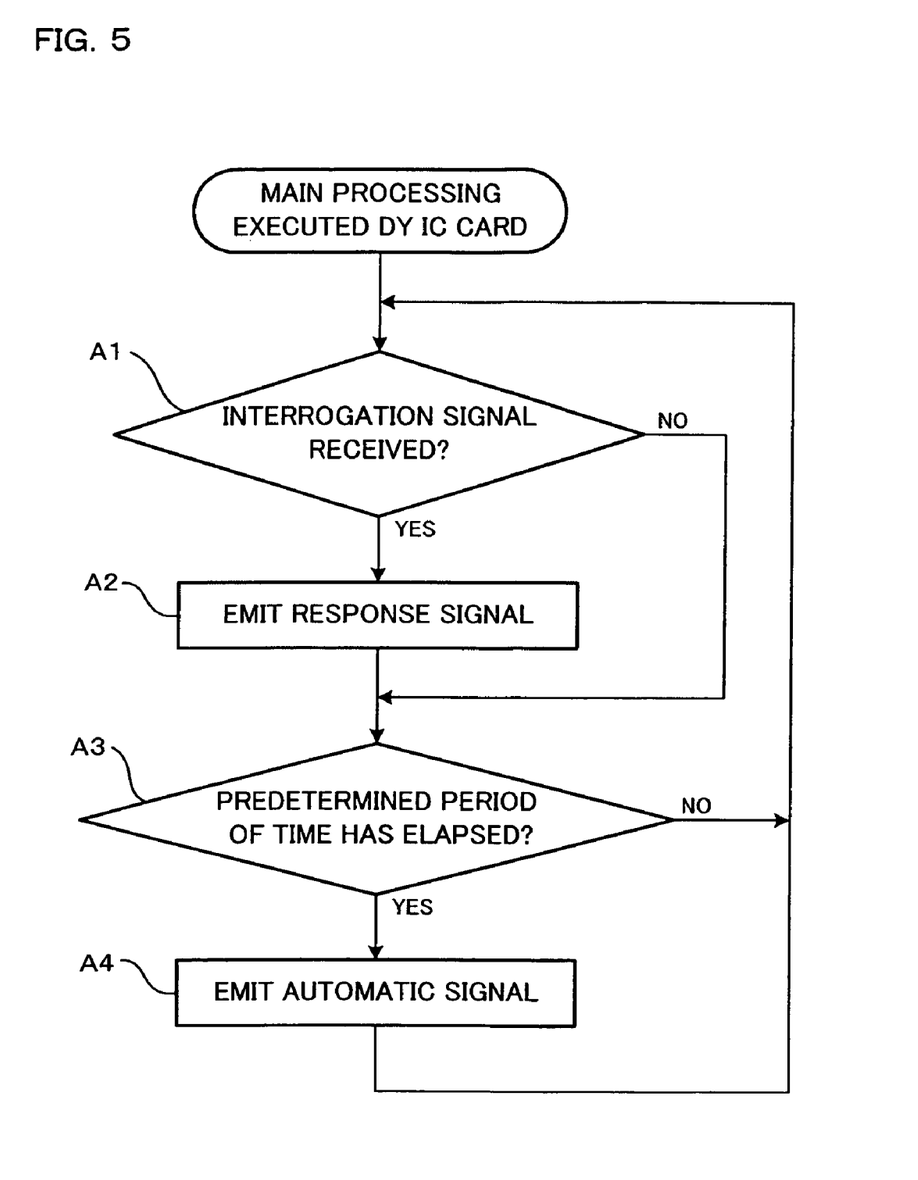
FIG. 5 is a flowchart showing a main processing that is executed by the IC card.

Next, a main processing that is executed by the CPU 62 of the IC card 60 will be described with reference to FIG. 5. First, the CPU 62 determines whether an interrogation signal is received from the enter/exit gate 30 or not (A1). When an interrogation signal is received (A1: YES), the CPU 62 emits a response signal that carries a staff identification code stored in the memory 63 (A2). Then, the processing proceeds to A3. When an interrogation signal is not received (A1: NO), the processing skips A2 and proceeds to A3.

In A3, the CPU 62 determines whether a predetermined period of time has elapsed since it previously emitted an automatic signal or not. When the predetermined period of time has elapsed (A3: YES), the CPU 62 emits an automatic signal that carries the staff identification code stored in the memory 63 (A4). Then, the processing returns to A1. When the predetermined period of time has not elapsed (A3: NO), the processing returns to A1 without performing A4.

Figure 6:
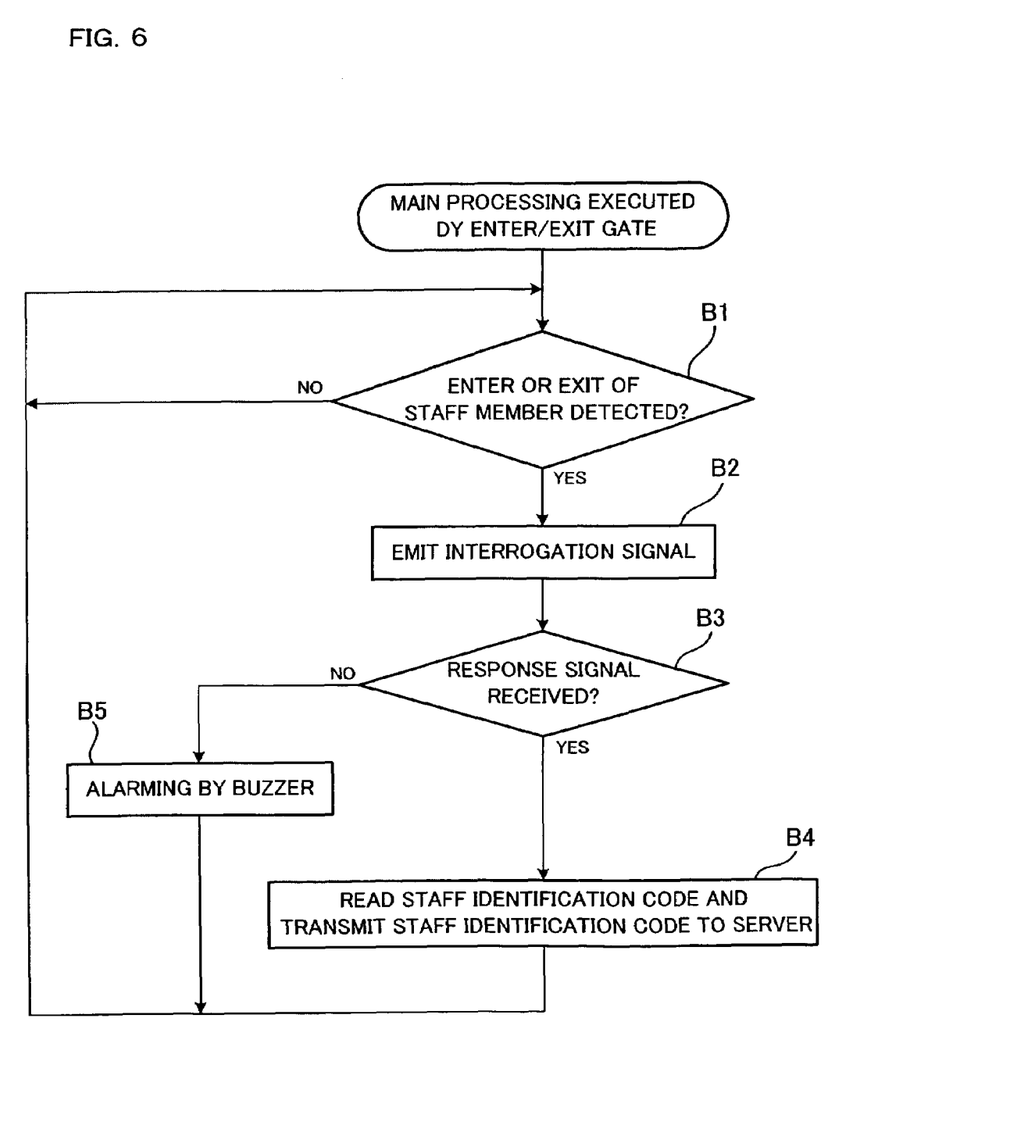
FIG. 6 is a flowchart showing a main processing that is executed by an enter/exit gate.

Next, a main processing that is executed by the CPU 31 of the enter/exit gate 30 will be described with reference to FIG. 6.

First, the CPU 31 determines whether the sensor 38 has detected a staff member 102 entering or exiting the office 101 or not (B1). When the sensor 38 has not detected a staff member 102 (B1: NO), the CPU 31 repeats the step B1 until a staff member 102 is detected. When the sensor 38 has detected a staff member 102 (B1: YES), the CPU 31 emits an interrogation signal to an IC card 60 that is carried around by the detected staff member 102 (B2). Then, the CPU 31 determines whether a response signal, which has been emitted from the IC card 60 in response to the interrogation signal, is received through the antenna 36 and the modulator/demodulator circuit 35, or not (B3). When a response signal is received (B3: YES), the CPU 31 reads a staff identification code included in the response signal, and transmits the staff identification code thus read to the server 40 through the communication unit 34 (B4). Then, the processing returns to B1. When a response signal is not received (B3: NO), the CPU 31 determines that the staff member 102 detected by the sensor 38 is a stranger carrying no IC card 60, and therefore makes the buzzer 37 emit an alarm sound (B5). Then, the processing returns to B1.

Figure 7:
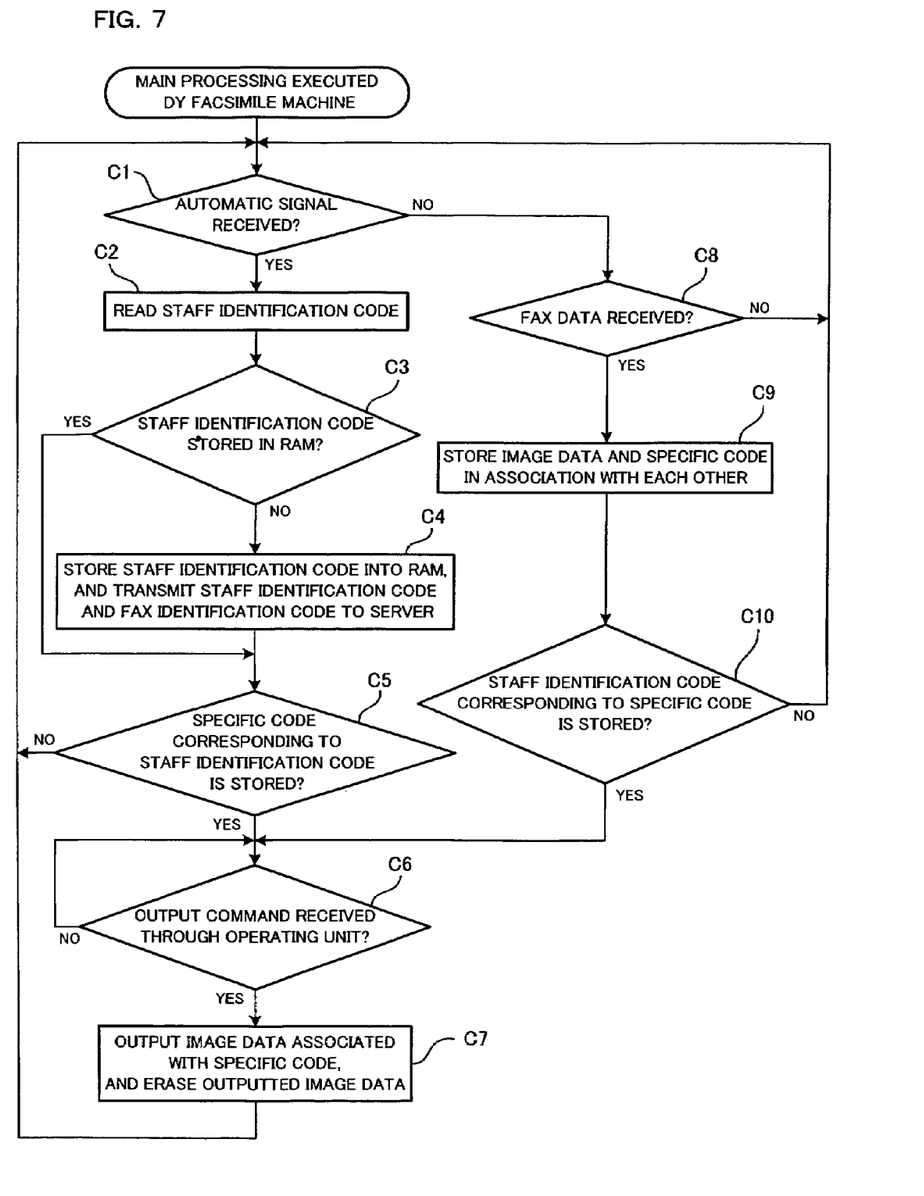
FIG. 7 is a flowchart showing a main processing that is executed by a facsimile machine.

Next, a main processing that is executed by the CPU 11 of the facsimile machine 10 will be described with reference to FIG. 7.

First, the CPU 11 determines whether an automatic signal is received through the antenna 16 and the demodulator circuit 15 from an IC card 60 that is carried around by any of the staff members 102 existing within the predetermined range, or not (C1). Here, the predetermined range means a communication coverage of the automatic signal. When an automatic signal is received (C1: YES), the CPU 11 reads a staff identification code that is included in the automatic signal (C2). Then, the CPU 11 determines whether the staff identification code read in C2 is stored in the RAM 13 or not (C3). When the staff identification code is not stored in the RAM 13 (C3: NO), the CPU 11 determines that a new staff member 102 exists around the facsimile machine 10. Thus, the CPU 11 stores the staff identification code into the RAM 13, and at the same time transmits the staff identification code and its fax identification code to the server 40 (C4). Then, the processing proceeds to C5. When the staff identification code is stored in the RAM 13 (C3: YES), the processing skips C4 and proceeds to C5.

In C5, the CPU 11 determines whether a specific code corresponding to the staff identification code read in C2 is stored in the RAM 13 or not (C5). When a corresponding specific code is not stored in the RAM 13 (C5: NO), the processing returns to C1. When a corresponding specific code is stored in the RAM 13 (C5: YES), the CPU 11 makes image data corresponding to the specific code ready for output, and determines whether an image data output command is inputted through the operating unit 17 or not (C6). Here, one may input the command by pressing an output button provided in the operating unit 17, by inputting a password, and the like. When an image data output command is not inputted (C6: NO), the CPU 11 waits until it is inputted. When an image data output command is inputted (C6: YES), the print unit 19 prints out the image data so that the image data is outputted, and then the outputted image data and the specific code are erased from the RAM 13 (C7). Then, the processing returns to C1.

When an automatic signal is not received from an IC card 60 (C1: NO), then the CPU 11 determines whether fax data is received or not (C8). When fax data is not received (C8: NO), the processing returns to C1. When fax data is received (C8: YES), image data and a specific code that are included in the fax data are associated with each other and stored into the RAM 13 (C9). Then, the CPU 11 determines whether a staff identification code corresponding to the specific code is stored in the RAM 13 or not (C10). When a staff identification code corresponding to the specific code is stored in the RAM 13 (C10: YES), the processing proceeds to C6. When a staff identification code corresponding to the specific code is not stored in the RAM 13 (C10: NO), the processing returns to C1.

Figure 8:
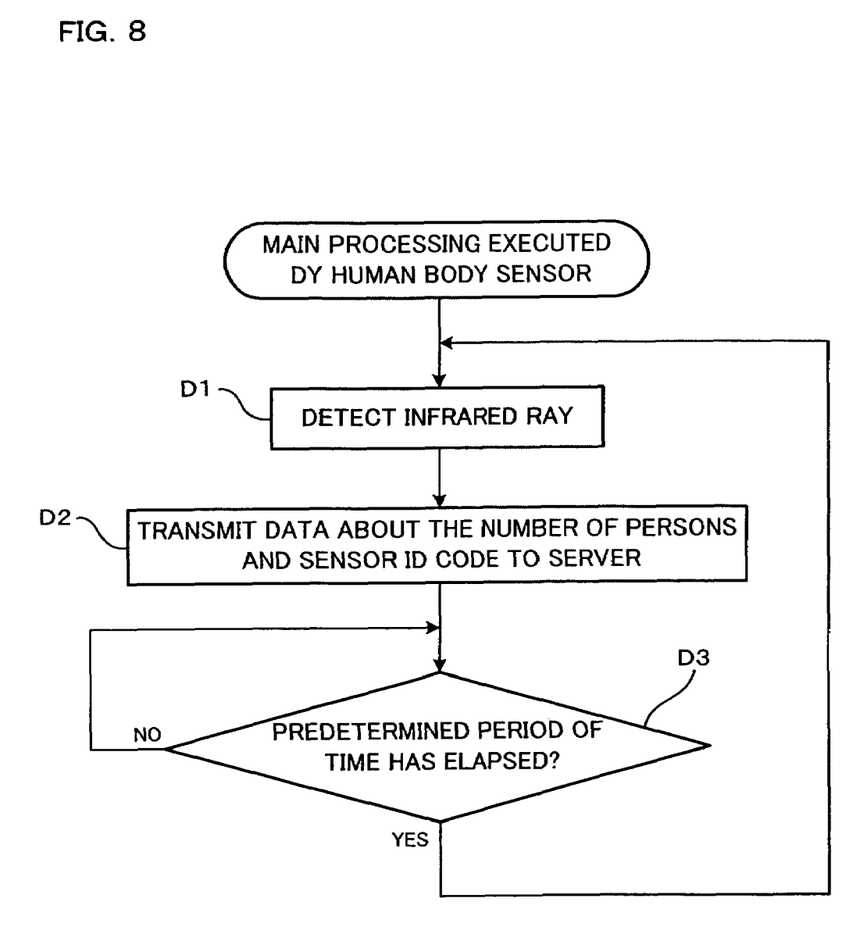
FIG. 8 is a flowchart showing a main processing that is executed by a human body sensor.

Next, a main processing that is executed by the human body sensor 20 will be described with reference FIG. 8.

First, the human body sensor 20 detects an infrared ray that is radiated from a body of a staff member 102 (D1). Then, the human body sensor 20 measures a temperature distribution, and uses a measurement result to detect how many staff members 102 are existing around a corresponding facsimile machine 10. Then, the human body sensor 20 transmits to the server 40 data about the number of persons detected and its sensor identification code (D2). Thereafter, the human body sensor 20 determines whether a predetermined period of time has elapsed since it previously detected the number of persons in D2, or not (D3). When a predetermined period of time has not elapsed yet (D3: NO), the human body sensor 20 waits until the predetermined period of time elapses. When a predetermined period of time has elapsed (D3: YES), the processing returns to D1 and repeats the above-described steps.

Figure 9:
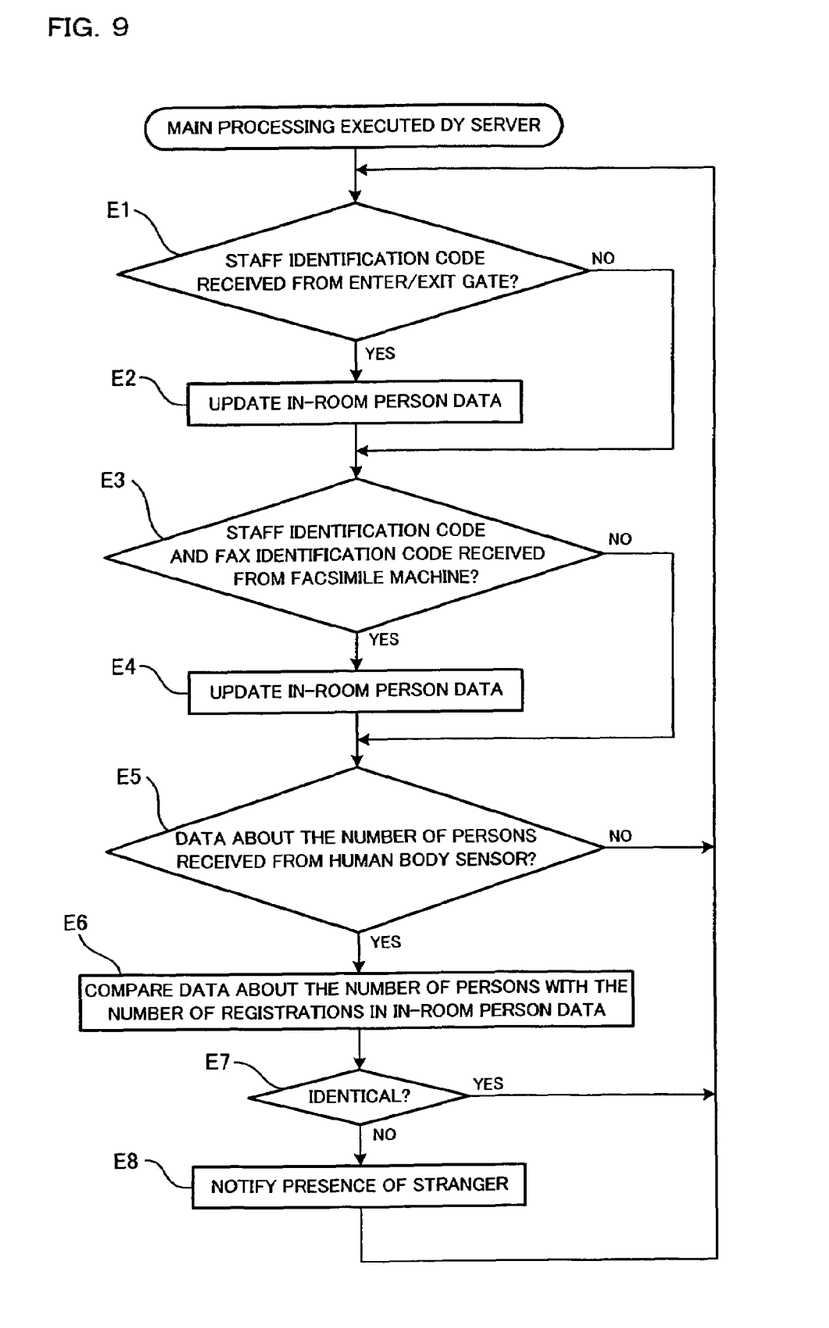
FIG. 9 is a flowchart showing a main processing that is executed by the server.

Next, a main processing that is executed by the server 40 will be described with reference to FIG. 9.

First, the server 40 determines whether a staff identification code is received from the enter/exit gate 30 or not (E1). When a staff identification code is not received (E1: NO), the processing proceeds to E3. When a staff identification code is received (E1: YES), the server 40 updates the in-room person data shown in FIG. 4 (E2). To be more specific, the server 40 determines whether the staff identification code received from the enter/exit gate 30 is registered in the in-room person data table or not. When it is registered, the server 40 determines that a staff member 102 having the staff identification code has exited the office 101, and therefore erases the staff identification code from the in-room person data table. When it is not registered, the server 40 determines that a new staff member 102 has entered the office 101, and therefore registers the staff identification code additionally into the in-room person data table. In this way, the server 40 can grasp entry or exit of a staff member 102. After E2, the processing proceeds to E3.

In E3, the server 40 determines whether a staff identification code and a fax identification code are received from any of the facsimile machines 10 that are data-communicably connected to the server 40, or not. When a staff identification code and a fax identification code are not received (E3: NO), the processing proceeds to E5. When a staff identification code and a fax identification code are received (E3: YES), the server 40 updates the in-room person data shown in FIG. 4 (E4). To be more specific, the server 40 determines whether the staff identification code received from a facsimile machine 10 is registered in the in-room person data table or not. When it is registered, a fax identification code associated with the staff identification code is rewritten into the received one. After E4, the processing proceeds to E5.

In E5, the server 40 determines whether data about the number of persons is received from the human body sensor 20 or not (E5). When data about the number of persons is not received (E5: NO), the processing returns to E1. When data about the number of persons is received (E5: YES), the server 40 compares these data about the number of persons, with the number of staff identification codes that are registered in the in-room person data table (E6). To be more specific, the server 40, which stores therein each sensor identification code in one-to-one correspondence with each fax identification code, finds from the in-room person data table a fax identification code corresponding to a sensor identification code that has been received together with the data about the number of persons. Then, the number of findings, which means the number of staff identification codes that are associated with the fax identification code, is compared with the data about the number of persons that has been received from the human body sensor 20 (E6). Thus, in E6, the number of staff identification codes that have been received from a facsimile machine 10 is compared with the number of staff members 102 the human body sensor 20 corresponding to the facsimile machine 10 has detected. Then, the server 40 determines whether they are identical or not (E7). When they are identical (E7: YES), the processing returns to E1. When they are not identical (E7: NO), the server 40 determines that there is a stranger and notifies it by means of a sound, an image, or the like (E8). Then, the processing returns to E1.

In this embodiment, as thus far described above, a destination of fax data is specified by a specific code. In C5 or C10, whether a received staff identification code and a specific code correspond to each other or not is determined. When it is determined that they correspond to each other (C5: YES or C10: YES), image data is outputted (C7). That is, only when a staff member 102 whose staff identification code corresponds to the specific code exists around a facsimile machine 10, image data is outputted from the facsimile machine 10. This ensures that the data can be received by a destination person, thus realizing a high-security data output.

A destination of fax data is specified by a specific code that corresponds to a staff identification code. Accordingly, even though a sender of data does not know where a destination person is, the sender can surely transmit the data to the destination person simply by inputting a staff identification code.

Moreover, only when an image data output command has been inputted through the operating unit 17 (C6: YES), i.e., only when a person has operated the operating unit 17 from outside, the facsimile machine 10 outputs image data (C7). For example, even though it is determined that a staff member 102 whose staff identification code corresponds to the specific code is existing around the facsimile machine 10 so that data is outputted, it may occur that no one notices the data output. However, such a situation can be prevented because the data is outputted only when a person has intentionally operated the operating unit 17 to command an output. Therefore, the data can more surely be received by a destination person, so that a higher-security data output can be realized.

In the server 40, data about the number of persons which has been received from each human body sensor 20, that is, data about the number of staff members 102 who exist around a facsimile machine 10 corresponding to each human body sensor 20, are compared with data, which is based on data received from each facsimile machine 10, about the number of staff members 102 who exist around the facsimile machine 10 (E6). This enables a high-security management of staff members 102. In a specifically exemplified case where a human body sensor 20 detects five persons existing around a corresponding facsimile machine 10 while four staff identification codes are received from the facsimile machine 10, it can be determined that there is a high possibility of presence of a stranger who carries no IC card 60.

Figure 10:
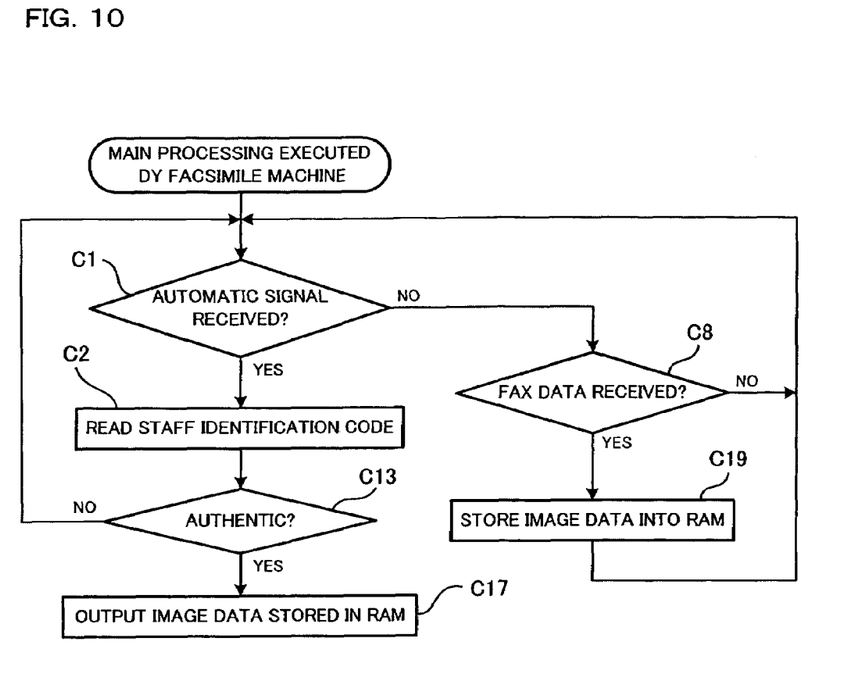
FIG. 10 is a flowchart showing a modification of the main processing that is executed by the facsimile machine.

Next, a modification of the main processing that is executed by the facsimile machine 10 will be described with reference to FIG. 10. In FIG. 10, the same steps as those in FIG. 7 are denoted by the common reference numerals, and specific descriptions thereof will be omitted. In this modification, a destination of fax data is not specified by a specific code, but instead the fax data is transmitted to all staff members 102. Authentic staff identification codes have been prestored in the facsimile machines 10.

First, the facsimile machine 10 determines whether an automatic signal is received from an IC card 60 or not (C1). When an automatic signal is not received (C1: NO), then the facsimile machine 10 determines whether fax data is received or not (C8). When fax data is received (C8: YES), image data included in the fax data is stored into the RAM 13 (C19). Then, the processing returns to C1.

When an automatic signal is received from an IC card 60 (C1: YES), the facsimile machine 10 reads a staff identification code that is included in the automatic signal (C2). Then, the facsimile machine 10 determines whether the staff identification code thus read in C2 is included in the authentic staff identification codes prestored, and thereby determines whether the staff identification code is authentic or not (C13). When the staff identification code is authentic (C13: YES), the facsimile machine 10 determines that a staff member 102 who has the authentic staff identification code is existing around the facsimile machine 10, and therefore outputs image data (C17).

In this modification, when a received staff identification code is authentic (C13: YES), image data is outputted (C17). Thus, a facsimile machine 10 outputs image data only when a staff member 102 who has an authentic staff identification code exists around the facsimile machine 10. This ensures that the data can be received by the staff member 102, thus realizing a high-security data output.

In addition, this can prevent a stranger who does not have an authentic staff identification code from receiving information that is intended only for a staff member 102 who has an authentic staff identification code, such as company's confidential information. In a case where, for example, no staff member 102 exists around a facsimile machine 10 but nevertheless image data is outputted, it is likely that a stranger receives or sees the data without permission, which raises a security problem. In this modification, however, such a problem can be prevented.

Further, if a facsimile machine 10 outputs data under a condition that no one exists around the facsimile machine 10, there may be caused jamming or scattering of print media, e.g. papers, resulting from too much output, and the like. However, these problems can be prevented in this modification.

In the above-described modification, the authentic staff identification codes may be stored not in the facsimile machines 10 but in the server 40. In this case, in C13, the facsimile machine 10 communicates with the server 40 in order to determine whether a staff identification code read in C2 is authentic or not. Alternatively, data for determining authenticity may be prestored in the facsimile machine 10 or in the server 40, and a piece of data that constitute a staff identification code read in C2 may be compared with the data for determining authenticity, in order to make the determination in C13.

After reading a staff identification code in B4, the enter/exit gate 30 may determine whether the staff identification code is authentic or not. When the staff identification code is authentic, the enter/exit gate 30 may notify a facsimile machine 10 that the staff identification code is authentic, to allow the facsimile machine 10 to output image data. In this case, when a staff member 102 having an authentic staff identification code exists in the office 101, the facsimile machine 10 outputs data. Accordingly, the staff member 102 can receive the data outputted from the facsimile machine 10. Outputting image data may be forbidden when a staff identification code is not authentic, i.e., when a stranger enters the office 101. This can prevent the stranger from receiving company's confidential information or the like.

It may be possible that several specific codes are preset in each of the facsimile machines 10 and, upon reception of fax data, a facsimile machine 10 determines whether the preset specific codes include one corresponding to the staff identification code read in C2 or not. When a specific code corresponding to the staff identification code is found prestored, image data may be outputted. In this case, a staff member 102 can receive fax data only from a particular facsimile machine 10. Thereby, a security for transmitted fax data can be improved more.

The output terminal is not limited to the facsimile machine 10, but may be a printer, a personal computer, a telephone, or the like.

Electronic data which is received by the output terminal is not limited to image data, but may be electronic mail data, sound data, one including both of image data and sound data, or the like. In the case of electronic mail data, data output may be made on a screen of a personal computer a destination staff member 102 is using.

The staff identification code and the fax identification code may take various forms. They may be figures, alphabets, or a combination of the both.

The mounted body 60b of the IC card 60 may not necessarily be mounted to the IC main body 60a. For example, it may be possible that the mounted body 60b has a casing-like shape which receives the IC main body 60a.

The IC card 60 may have the IC main body 60a alone without the mounted body 60b.

In the above-described embodiment, the entry/exit gate 30 that reads a staff identification code out of an IC card 60 carried around by a staff member 102 is provided at an entrance to the office 101. However, this is not limitative, and any arbitrary equipment placed in the office 101, such as a desk, a personal computer, or the like, may be used to read a staff identification code. In such a case where an equipment which has been placed originally in the office 101 is used to read a staff identification code, there is no need to reserve a space for providing a new device such as the entry/exit gate 30.

The IC chip 61 may be provided on, instead of the IC card 60, a portable phone, a personal handyphone system, or the like.

The data output system of the present invention includes at least an output terminal and an IC chip. The human body sensors 20, the enter/exit gate 30, and the server 40 may be omitted.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An output terminal which transmits/receives electronic data to/from another output terminal, the output terminal and the other output terminal provided apart from each other in at least one building, the output terminal comprising:
   a communication unit which transmits/receives a specific code for specifying the electronic data and a destination of the electronic data;
   a storage device;
   an antenna which reads an identification code from an IC chip storing therein identification codes corresponding to specific codes on one-by-one basis;
   an output unit which outputs the electronic data; and
   a CPU which performs the steps of:
      (a1) receiving the electronic data and the specific code,
      (a2) storing the electronic data and the specific code in the storage device,
      (a3) causing the antenna to read the identification code, only when the IC chip storing the identification code is within a predetermined range,
      (a4) determining whether the read identification code corresponds to the specific code stored in the storage device, and
      (a5) causing the output unit to output the electronic data when the identification code corresponds to the specific code, and when the IC chip storing therein the identification code corresponding to the specific code is within the predetermined range.

2. The output terminal according to claim 1, wherein the predetermined range in (a3) and (a5) is a receivable range of the antenna provided to the output terminal.

3. The output terminal according to claim 1, wherein the output terminal is a facsimile machine.

4. An electronic data output system which performs transmission/reception of electronic data between a plurality of output terminals located apart from each other, wherein
   [1] each of the output terminal includes:
      a communication unit which transmits/receives a specific code for specifying the electronic data and a destination of the electronic data,
      a storage device,
      an antenna which reads an identification code from an IC chip storing therein identification codes corresponding to specific codes on one-by-one basis, and
      an output unit which outputs the electronic data; and
   [2] the electronic data output system performs the steps of:
      (b1) receiving the electronic data and the specific code,
      (b2) storing the electronic data and the specific code in the storage device,
      (b3) causing the antenna to read the identification code, only when the IC chip storing the identification code is within a predetermined range,
      (b4) determining whether the read identification code corresponds to the specific code stored in the storage device, and
      (b5) causing the output unit to output the electronic data when the identification code corresponds to the specific code, and when the IC chip storing therein the identification code corresponding to the specific code is within the predetermined range.

5. The system according to claim 4, wherein the predetermined range in (b3) and (b5) is a receivable range of the antenna provided to each of the output terminals.

6. The system according to claim 4, wherein each of the output terminals is a facsimile machine.

7. A electronic data outputting method of an output terminal which transmits/receives electronic data to/from another output terminal, the output terminal and the other output terminal provided apart from each other in at least one building, wherein:
   [1] the output terminal includes:
      a communication unit which transmits/receives a specific code for specifying the electronic data and a destination of the electronic data,
      a storage device,
      an antenna which reads an identification code from an IC chip storing therein identification codes corresponding to specific codes on one-by-one basis, and
      an output unit which outputs the electronic data; and
   [2] the method comprises the steps of:
      receiving the electronic data and the specific code,
      storing the received electronic data and specific code in the storage device,
      causing the antenna to read the identification code when the IC chip storing the identification code is within a predetermined range,
      determining whether the read identification code corresponds to the specific code stored in the storage device, and
      causing the output unit to output the electronic data when the identification code corresponds to the specific code, and when the IC chip storing therein the identification code corresponding to the specific code is within the predetermined range.

* * * * *